(12) United States Patent
Soto (10) Patent No.: US 9,282,797 B1
(45) Date of Patent: Mar. 15, 2016

(54) WHEELED FISHING COOLER (71) Applicant: Arturo Soto, Jacksonville, FL (US)

(72) Inventor: Arturo Soto, Jacksonville, FL (US)

( * ) Notice: Subject to any disclaimer, the term of this patent is extended or adjusted under 35 U.S.C. 154(b) by 0 days.

(21) Appl. No.: 14/731,179

(22) Filed: Jun. 4, 2015

(51) Int. Cl.
| | |
|---|---|
| B62B 1/00 | (2006.01) |
| A45C 11/20 | (2006.01) |
| A45C 5/14 | (2006.01) |
| A45C 13/00 | (2006.01) |
| A45C 13/02 | (2006.01) |
| A45C 13/26 | (2006.01) |
| A45C 13/30 | (2006.01) |
| B62B 3/00 | (2006.01) |

(52) U.S. Cl.
CPC . *A45C 11/20* (2013.01); *A45C 5/14* (2013.01); *A45C 13/005* (2013.01); *A45C 13/02* (2013.01); *A45C 13/262* (2013.01); *A45C 13/30* (2013.01); *B62B 3/001* (2013.01); *B62B 3/005* (2013.01); *A45C 2013/267* (2013.01); *A45C 2013/306* (2013.01)

(58) Field of Classification Search
CPC ....... A01K 97/22; A01K 97/08; A01K 97/10; B62B 1/262; B62B 1/008; B62B 2202/52
See application file for complete search history.

(56) References Cited

U.S. PATENT DOCUMENTS

| | | | | | |
|---|---|---|---|---|---|
| 3,997,181 | A | * | 12/1976 | Jaco et al. | 280/47.19 |
| 4,355,818 | A | * | 10/1982 | Watts | 280/654 |
| D319,907 | S | * | 9/1991 | Fountain | D34/26 |
| 5,100,198 | A | * | 3/1992 | Baltzell | 312/235.2 |
| 5,159,777 | A | * | 11/1992 | Gonzalez | 43/54.1 |
| 5,203,815 | A | * | 4/1993 | Miller | 43/21.2 |
| 5,228,706 | A | * | 7/1993 | Boville | 280/43.22 |
| D341,238 | S | * | 11/1993 | Sloan, III | D34/18 |
| 5,259,215 | A | * | 11/1993 | Rocca | 62/371 |
| 5,471,779 | A | * | 12/1995 | Downey | 43/54.1 |
| 5,480,170 | A | * | 1/1996 | Kaiser, II | 280/30 |
| 6,076,298 | A | * | 6/2000 | Teel | 43/54.1 |
| 6,079,777 | A | * | 6/2000 | Simmons et al. | 297/217.1 |
| 6,082,757 | A | * | 7/2000 | Lin | 280/654 |
| 6,131,925 | A | * | 10/2000 | Weldon | 280/30 |
| 6,185,860 | B1 | * | 2/2001 | Thibodeaux | 43/54.1 |
| 6,311,991 | B1 | * | 11/2001 | Conrado et al. | 280/47.26 |
| 6,467,779 | B1 | * | 10/2002 | Mills | 280/47.26 |
| 6,474,097 | B2 | * | 11/2002 | Treppedi et al. | 62/457.7 |
| 6,550,791 | B2 | * | 4/2003 | Ramsey | 280/47.19 |
| 6,648,349 | B1 | * | 11/2003 | Waller et al. | 280/47.35 |
| 6,708,995 | B2 | * | 3/2004 | Norris | 280/204 |
| 6,742,789 | B1 | * | 6/2004 | Nowak | 280/47.26 |
| 6,758,482 | B2 | * | 7/2004 | Stallbaumer | 280/47.27 |
| 6,796,319 | B1 | * | 9/2004 | Patarra et al. | 135/16 |
| 6,883,267 | B1 | * | 4/2005 | Pruitt | 43/54.1 |
| 6,962,354 | B1 | * | 11/2005 | Miller | 280/47.26 |
| 6,993,931 | B1 | * | 2/2006 | Hamilton | 62/457.7 |
| 7,155,859 | B1 | * | 1/2007 | Brooks | 43/54.1 |
| 7,210,545 | B1 | * | 5/2007 | Waid | 180/65.1 |
| 7,384,051 | B1 | * | 6/2008 | Haire | 280/47.34 |
| 7,389,608 | B1 | * | 6/2008 | MacKay | 43/57 |
| 7,415,794 | B1 | | 8/2008 | Thompson | |

(Continued)

*Primary Examiner* — Hau Phan
*Assistant Examiner* — Jacob Meyer
(74) *Attorney, Agent, or Firm* — Crossley Patent Law (57) ABSTRACT

A wheeled fishing cooler including a base, a cooler disposed within the base, a hinged lid attached to a rear side of the base, a U-shaped telescopic handle having a right end and a left end, an axel, a pair of wheels, a plurality of tubes, and a leg support. The leg support has a pair of horizontal supports, a pair of vertical supports, and a crossbeam. Each of the plurality of tubes is configured to hold a fishing rod and, alternately, a sun umbrella.

8 Claims, 6 Drawing Sheets

(56) References Cited

U.S. PATENT DOCUMENTS

| | | | |
|---|---|---|---|
| 7,703,795 B2 * | 4/2010 | Williamson | 280/656 |
| 7,823,906 B2 * | 11/2010 | Darling, III | 280/651 |
| D638,190 S * | 5/2011 | Spann | D34/14 |
| 7,963,530 B1 * | 6/2011 | Garcia | 280/30 |
| 8,069,939 B1 * | 12/2011 | Metzler | 180/19.3 |
| D661,451 S * | 6/2012 | Armstrong et al. | D34/17 |
| 8,256,156 B1 * | 9/2012 | Burgoyne, Jr. | 43/54.1 |
| 8,465,031 B2 * | 6/2013 | Coghill, Jr. | 280/79.3 |
| 8,544,141 B1 * | 10/2013 | Kyde et al. | 15/264 |
| 8,746,377 B1 * | 6/2014 | Dunbar | 180/19.2 |
| 8,960,470 B2 * | 2/2015 | Tarble et al. | 220/23.88 |
| 9,022,395 B1 * | 5/2015 | Vanderberg | 280/47.26 |
| 9,061,695 B1 * | 6/2015 | Mann | |
| 2002/0070517 A1 * | 6/2002 | Ramsey | 280/47.19 |
| 2002/0095947 A1 * | 7/2002 | Treppedi et al. | 62/457.9 |
| 2003/0011173 A1 * | 1/2003 | Shall | 280/651 |
| 2003/0193156 A1 * | 10/2003 | Norris | 280/204 |
| 2005/0230936 A1 * | 10/2005 | Van Horn et al. | 280/641 |
| 2007/0001409 A1 * | 1/2007 | Kaplan | 280/35 |
| 2008/0179847 A1 * | 7/2008 | DeFrancia | 280/47.26 |
| 2008/0284119 A1 * | 11/2008 | Williamson | 280/30 |
| 2010/0059950 A1 * | 3/2010 | Coghill, Jr. | 280/47.26 |
| 2011/0025005 A1 * | 2/2011 | Howell | 280/47.24 |
| 2011/0226003 A1 * | 9/2011 | Chaney et al. | 62/457.7 |
| 2011/0239525 A1 * | 10/2011 | Morales | 43/54.1 |
| 2013/0193673 A1 * | 8/2013 | Vanderberg et al. | 280/655 |

* cited by examiner

WHEELED FISHING COOLER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of coolers are known in the prior art. However, what has been needed is a wheeled fishing cooler including a base, a cooler disposed within the base, a hinged lid attached to the base, a U-shaped telescopic handle, an axel, a pair of wheels, a plurality of tubes, and a leg support. What has also been needed is for the leg support to comprise a pair of horizontal supports, a pair of vertical supports, and a crossbeam. Each of the plurality of tubes is configured to hold a fishing rod and, alternately, a sun umbrella. Lastly, what has been needed is for the wheeled fishing cooler to optionally comprise a pair of hooks, a pair of grab handles, a plurality of cup holders, and a divider separating a first compartment from a second compartment. The wheeled fishing cooler thus provides a user with an easy and convenient way to carry or pull fishing rods, chairs, sun umbrellas, and a cooler. Furthermore, the leg support and the pair of wheels keep the wheeled fishing cooler off the ground and ensure its stability and ease of transport.

FIELD OF THE INVENTION

The present invention relates to coolers, and more particularly, to a wheeled fishing cooler.

SUMMARY OF THE INVENTION

The general purpose of the present wheeled fishing cooler, described subsequently in greater detail, is to provide a fishing cooler which has many novel features that result in a wheeled fishing cooler which is not anticipated, rendered obvious, suggested, or even implied by prior art, either alone or in combination thereof.

To accomplish this, the present wheeled fishing cooler comprises a base having a right side, a left side, a front side, a rear side, and a bottom side. Each of the right side, the left side, the front side, the rear side, and the bottom side has an exterior surface, an interior surface, a top surface, and a bottom surface. A cooler is disposed within the base. The cooler has a right area, a left area, a front area, a rear area, and a bottom area. Each of the right area, the left area, the front area, the rear area, and the bottom area has an external surface, an internal surface, a top edge, and a bottom edge. A surface area of the cooler substantially conforms to a surface area of the base. The cooler is optionally slidably removable from the base. A hinged lid is attached to the rear side of the base proximal the top surface of the base. The lid has an upper surface and a lower surface.

The wheeled fishing cooler further comprises a U-shaped telescopic handle. The telescopic handle has a right end and a left end. Each of the right end and the left end is disposed on the exterior surface of the front side and the rear side, respectively, proximal the right side of the base. The right end is colinearly disposed with the left end. An axel is continuously disposed through each of the front side of the base and the rear side of the base from proximal the exterior surface of the front side to proximal the exterior surface of the rear side proximal the bottom side and the right side. The axel has a right edge and a left edge. A pair of wheels comprises a first wheel and a second wheel. Each of the first wheel and the second wheel is medially disposed through the right edge of the axel and the left edge of the axel, respectively.

The wheeled fishing cooler further comprises a leg support. The leg support comprises a pair of horizontal supports. The pair of horizontal supports comprises a front horizontal support and a rear horizontal support. Each of the front horizontal support and the rear horizontal support has a back end and a front end. Each of the front horizontal support and the rear horizontal support is continuously disposed from proximal the right side of the base to proximal the left side of the base on the front side and the rear side, respectively. The front horizontal support and the rear horizontal support are colinearly disposed. The leg support further comprises a pair of vertical supports. The pair of vertical supports comprises a front vertical support and a rear vertical support. Each of the front vertical support and the rear vertical support has a top end and a bottom end. The bottom end of each of the front vertical support and the rear vertical support is disposed on a surface of the ground. The top end of each of the front vertical support and the rear vertical support is disposed on the front horizontal support and the rear horizontal support, respectively, proximal the front end. The front vertical support and the rear vertical support are colinearly disposed. The pair of vertical supports is perpendicularly disposed with the pair of horizontal supports. A crossbeam is continuously disposed underneath the base from proximal the bottom end of the front vertical support to proximal the bottom end of the rear vertical support. The crossbeam is perpendicularly disposed with the pair of vertical supports.

The wheeled fishing cooler further comprises a plurality of tubes. Each of the plurality of tubes is disposed on at least one of the front horizontal support and the rear horizontal support. Each of the plurality of tubes is configured to hold a fishing rod and, alternately, a sun umbrella. The plurality of tubes can optionally be polyvinyl chloride.

The wheeled fishing cooler can optionally further comprise a pair of hooks. The pair of hooks comprises a right hook and a left hook. Each of the right hook and the left hook is medially disposed on the right side of the base and the left side of the base, respectively, proximal the top surface. The pair of hooks is configured to securingly attach at least one elastic cord across the upper surface of the lid. The elastic cord is optionally a bungee cord. The wheeled fishing cooler can optionally further comprise a pair of grab handles. The pair of grab handles comprises a right grab handle and a left grab handle. Each of the right grab handle and the left grab handle is medially disposed on the right side and the left side, respectively, underneath the right hook and the left hook, respectively. The pair of grab handles is configured to assist the user in lifting the base. The pair of grab handles can optionally be rubberized.

The wheeled fishing cooler can optionally further comprise a plurality of cup holders. Each of the plurality of cup holders is disposed on the upper surface of the lid. The wheeled fishing cooler can optionally further comprise a first compartment disposed within the cooler and a second compartment disposed within the cooler. A divider is continuously disposed from the internal surface of the right area to the internal surface of the left area. A height of the divider substantially conforms to a height of the cooler. The divider is configured to separate the first compartment from the second compartment. The divider and the bottom area of the cooler are perpendicularly disposed. A pair of drain plugs comprises a first drain plug and a second drain plug. Each of the first drain plug and the second drain plug is continuously disposed through the right area of the cooler from the first compartment and the second compartment, respectively, to the exterior surface of the right side of the base.

Thus has been broadly outlined the more important features of the present wheeled fishing cooler so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 6 thereof, an example of the instant wheeled fishing cooler employing the principles and concepts of the present wheeled fishing cooler and generally designated by the reference number 10 will be described.

Figure 6:
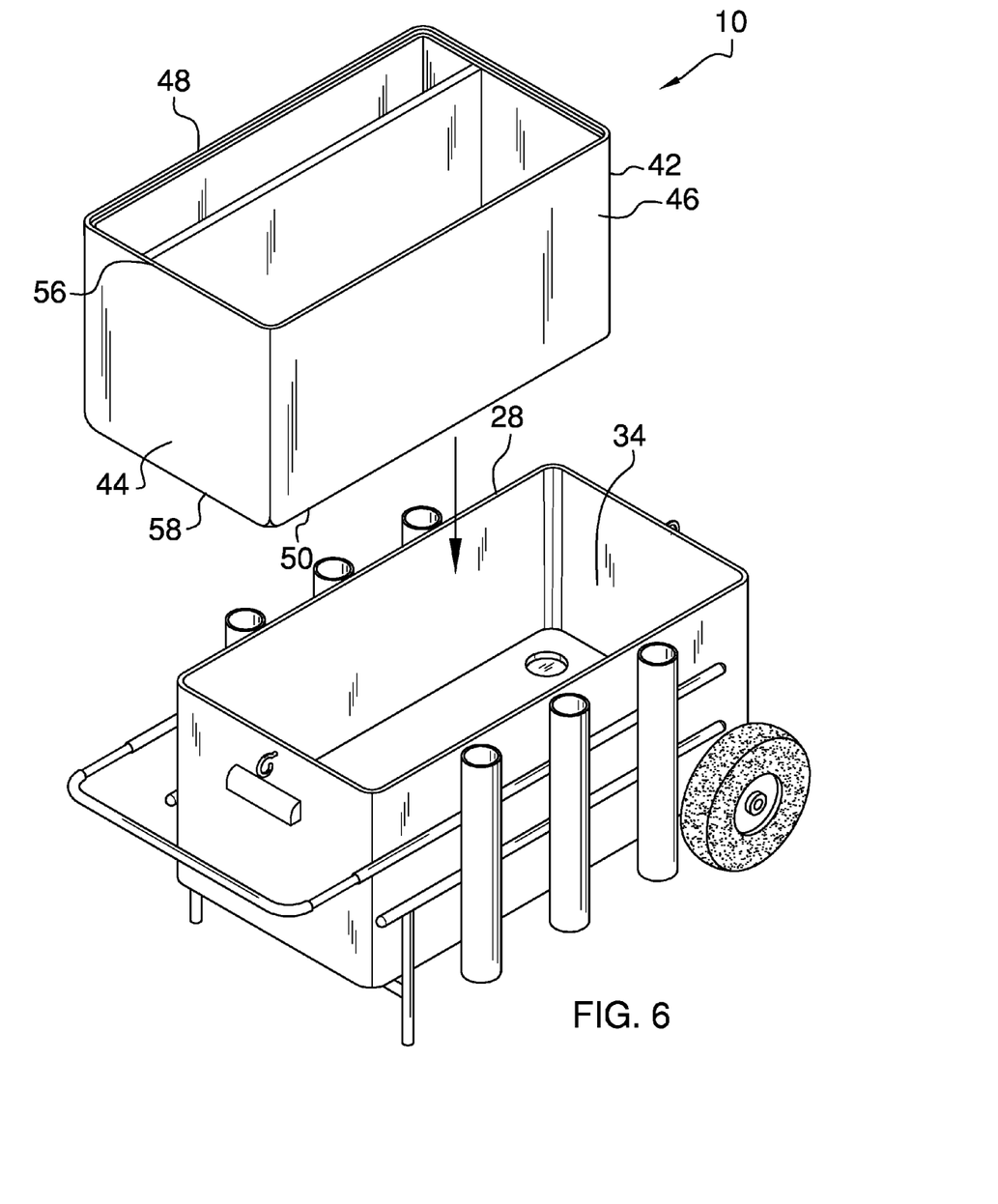
FIG. 6 is an exploded view showing a cooler and a base.

Referring to FIGS. 1 through 6 the present wheeled fishing cooler 10 is illustrated. The wheeled fishing cooler 10 comprises a base 20 having a right side 22, a left side 24, a front side 26, a rear side 28, and a bottom side 30. Each of the right side 22, the left side 24, the front side 26, the rear side 28, and the bottom side 30 has an exterior surface 32, an interior surface 34, a top surface 36, and a bottom surface 38. A cooler 40 is disposed within the base 20. As best shown in FIG. 6, the cooler 40 has a right area 42, a left area 44, a front area 46, a rear area 48, and a bottom area 50. Each of the right area 42, the left area 44, the front area 46, the rear area 48, and the bottom area 50 has an external surface 52, an internal surface 54, a top edge 56, and a bottom edge 58. A hinged lid 60 is attached to the rear side 28 of the base 20 proximal the top surface 36 of the base 20. The lid 60 has an upper surface 62 and a lower surface 64.

The wheeled fishing cooler 10 further comprises a U-shaped telescopic handle 66. The telescopic handle 66 has a right end 68 and a left end 70. Each of the right end 68 and the left end 70 is disposed on the exterior surface of the front side 26 and the rear side 28, respectively, proximal the right side 22 of the base 20. The right end 68 is colinearly disposed with the left end 70. An axel 72 is continuously disposed through each of the front side 26 of the base 20 and the rear side 28 of the base 20 from proximal the exterior surface 32 of the front side 26 to proximal the exterior surface 32 of the rear side 28 proximal the bottom side 30 and the right side 22. The axel 72 has a right edge 74 and a left edge 76. A pair of wheels 78 comprises a first wheel 80 and a second wheel 82. Each of the first wheel 80 and the second wheel 82 is medially disposed through the right edge 74 of the axel 72 and the left edge 76 of the axel 72, respectively.

Figure 1:
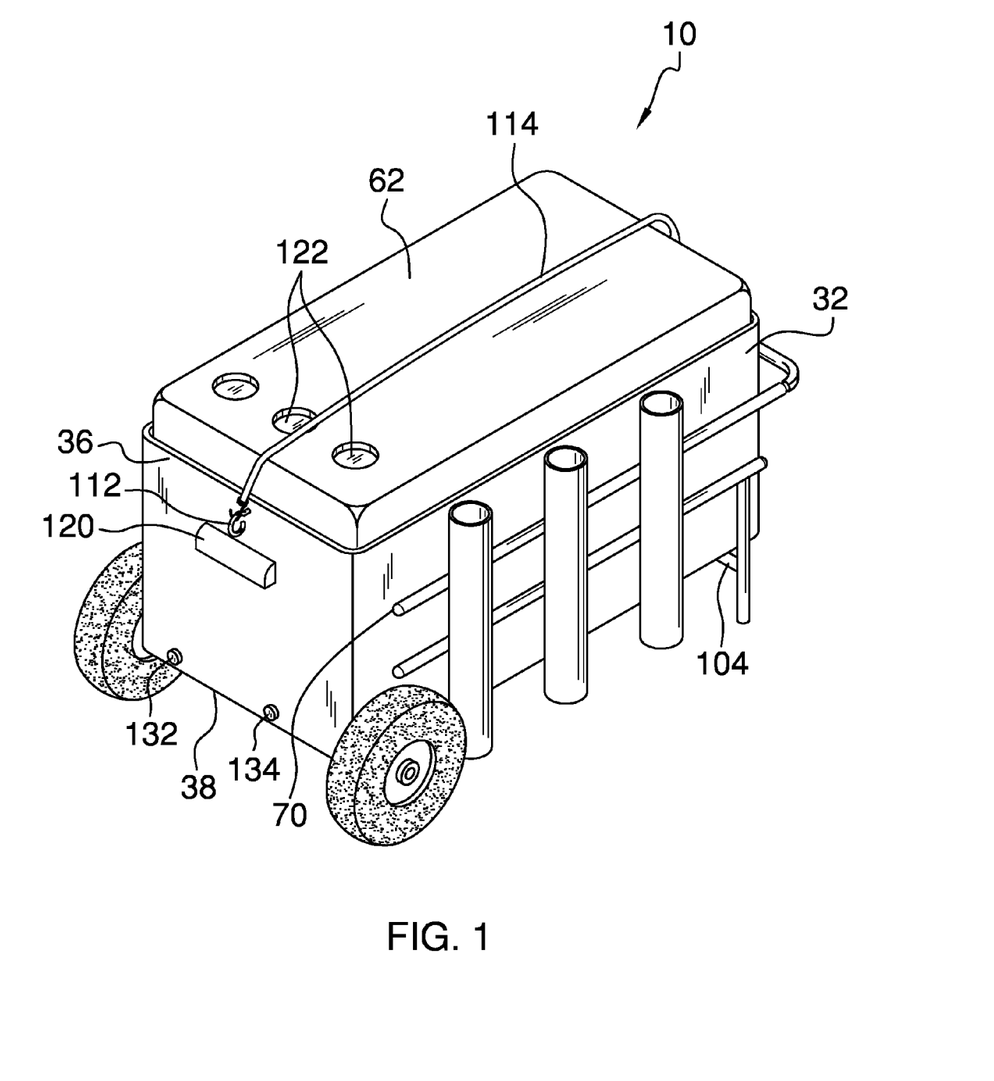
FIG. 1 is a rear isometric view.
Figure 2:
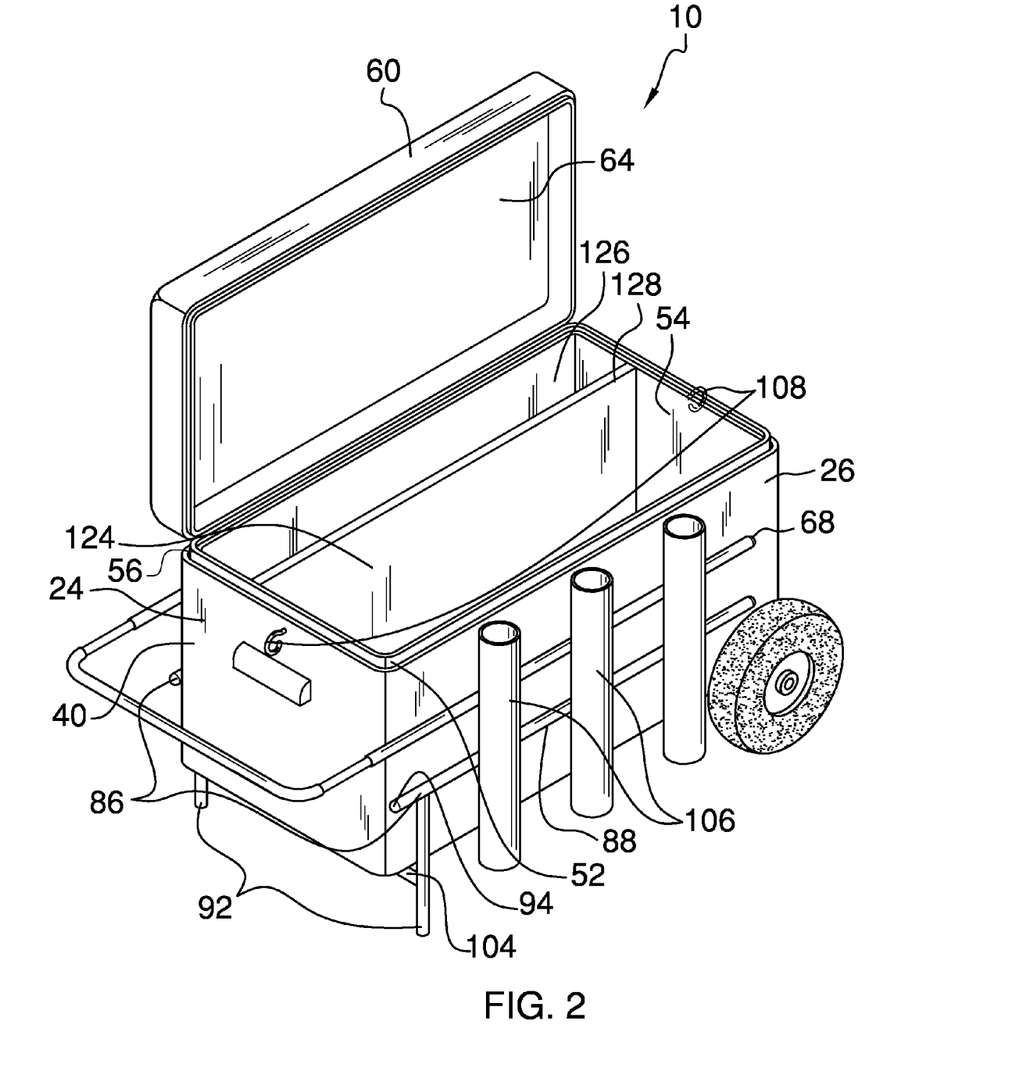
FIG. 2 is a front isometric view.
Figure 3:
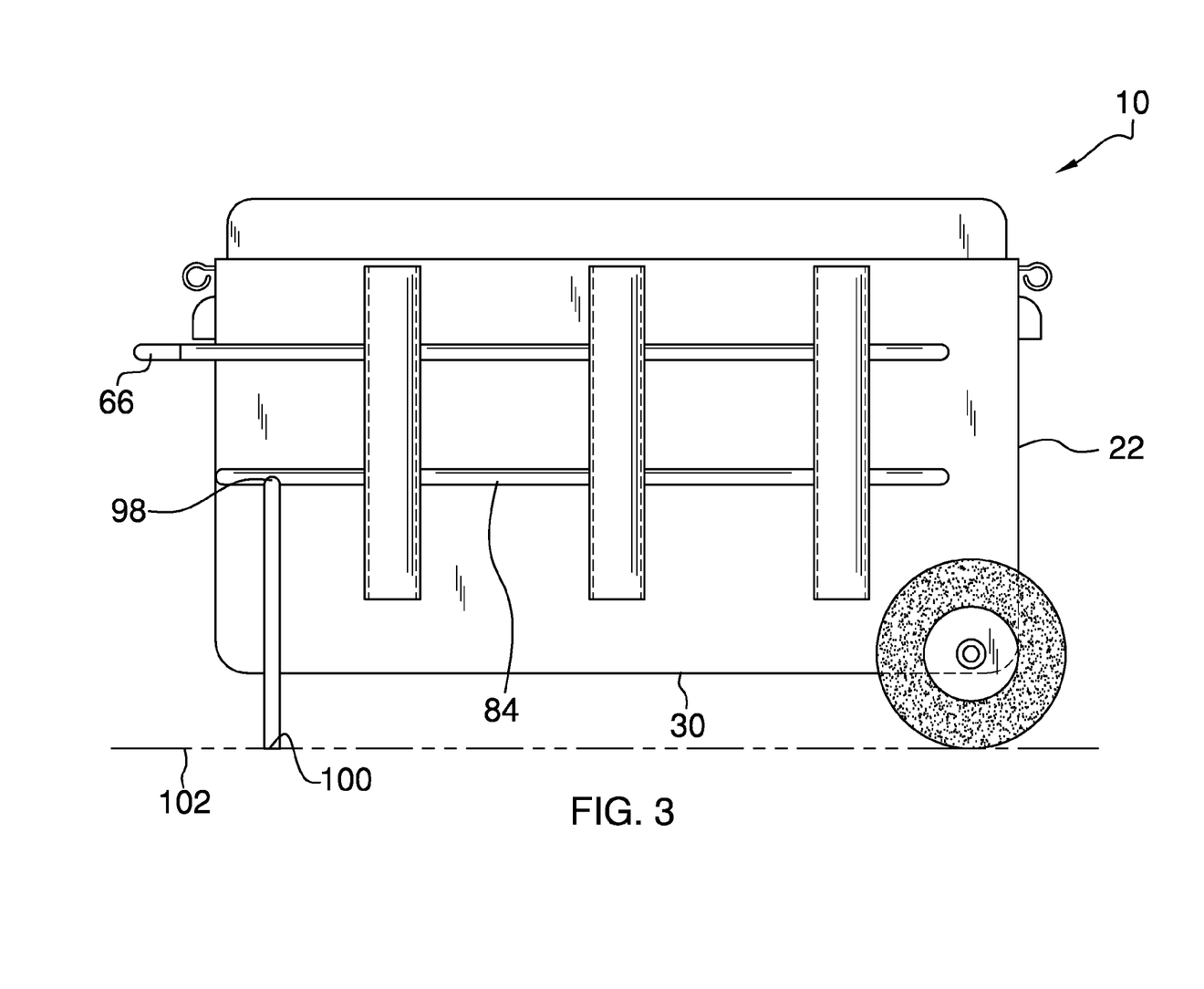
FIG. 3 is a front elevation view.
Figure 4:
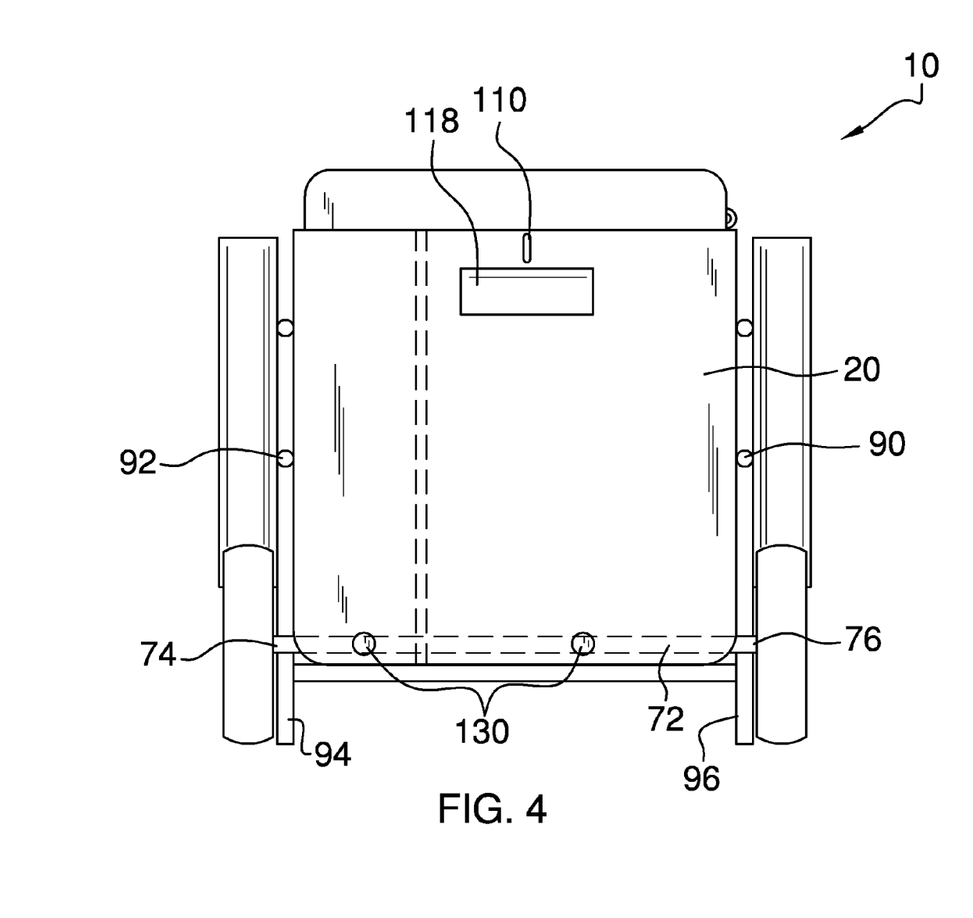
FIG. 4 is a rear elevation view.
Figure 5:
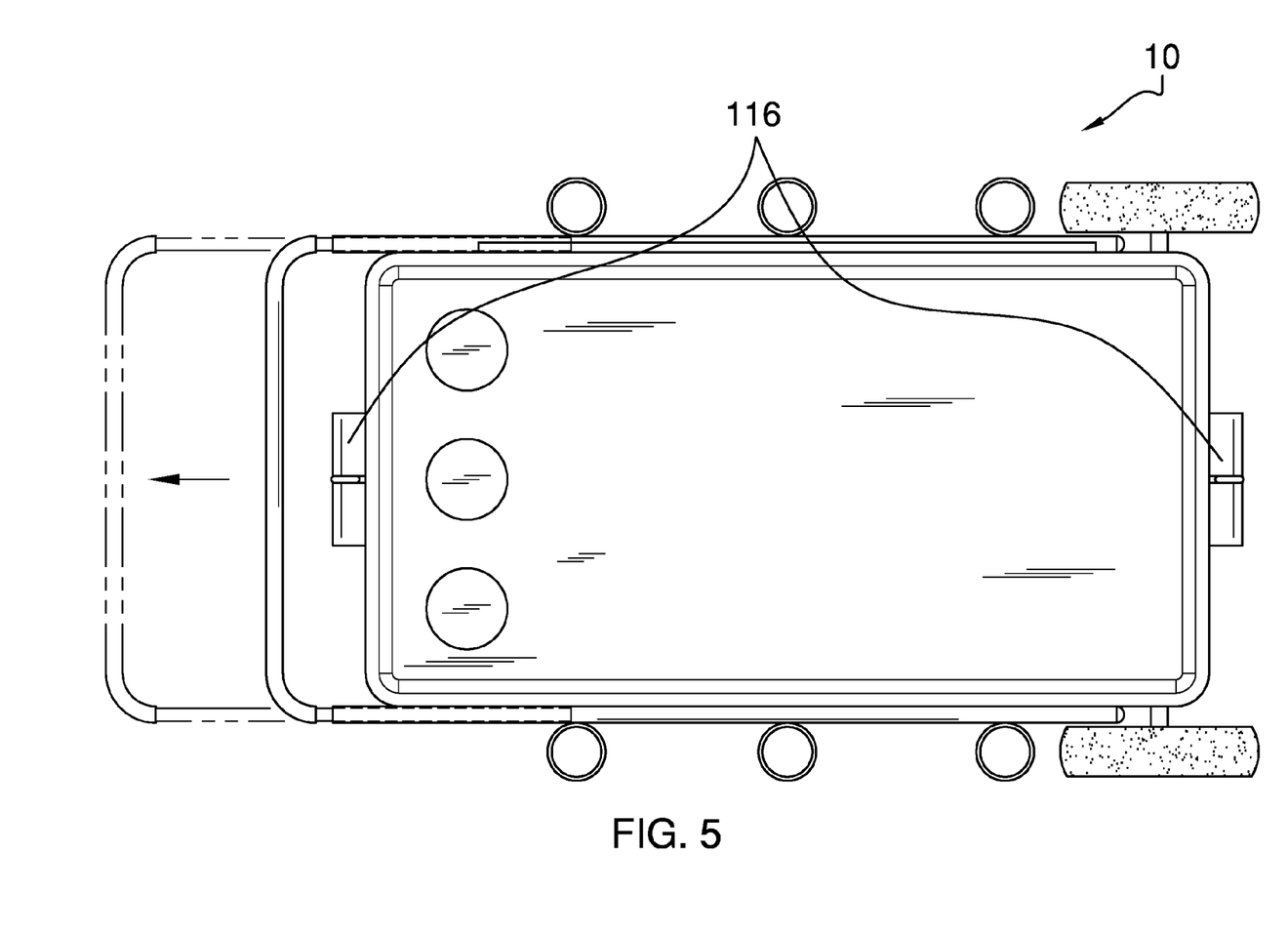
FIG. 5 is a top plan view.

As best shown in FIGS. 1 and 2, the wheeled fishing cooler 10 further comprises a leg support 84. The leg support 84 comprises a pair of horizontal supports 86. The pair of horizontal supports 86 comprises a front horizontal support 88 and a rear horizontal support 90. Each of the front horizontal support 88 and the rear horizontal support 90 has a back end 92 and a front end 94. Each of the front horizontal support 88 and the rear horizontal support 90 is continuously disposed from proximal the right side 22 of the base 20 to proximal the left side 24 of the base 20 on the front side 26 and the rear side 28, respectively. The front horizontal support 88 and the rear horizontal support 90 are colinearly disposed. The leg support 84 further comprises a pair of vertical supports 92. The pair of vertical supports 92 comprises a front vertical support 94 and a rear vertical support 96. Each of the front vertical support 94 and the rear vertical support 96 has a top end 98 and a bottom end 100. The bottom end 100 of each of the front vertical support 94 and the rear vertical support 96 is disposed on a surface of the ground 102. The top end 98 of each of the front vertical support 94 and the rear vertical support 96 is disposed on the front horizontal support 88 and the rear horizontal support 90, respectively, proximal the front end 94. The front vertical support 94 and the rear vertical support 96 are colinearly disposed. The pair of vertical supports 92 is perpendicularly disposed with the pair of horizontal supports 86. A crossbeam 104 is continuously disposed underneath the base 20 from proximal the bottom end 100 of the front vertical support 94 to proximal the bottom end 100 of the rear vertical support 96. The crossbeam 104 is perpendicularly disposed with the pair of vertical supports 92.

The wheeled fishing cooler 10 further comprises a plurality of tubes 106. Each of the plurality of tubes 106 is disposed on at least one of the front horizontal support 88 and the rear horizontal support 90.

As best shown in FIG. 1, the wheeled fishing cooler can optionally further comprise a pair of hooks 108. The pair of hooks 108 comprises a right hook 110 and a left hook 112. Each of the right hook 110 and the left hook 112 is medially disposed on the right side 22 of the base 20 and the left side 24 of the base 20, respectively, proximal the top surface 36. The pair of hooks 108 is configured to securingly attach at least one elastic cord 114 across the upper surface 62 of the lid 60. The wheeled fishing cooler 10 can optionally further comprise a pair of grab handles 116. The pair of grab handles 116 comprises a right grab handle 118 and a left grab handle 120. Each of the right grab handle 118 and the left grab handle 120 is medially disposed on the right side 22 and the left side 24, respectively, underneath the right hook 110 and the left hook 112, respectively.

As best shown in FIG. 1, the wheeled fishing cooler 10 can optionally further comprise a plurality of cup holders 122. Each of the plurality of cup holders 122 is disposed on the upper surface 62 of the lid 60. The wheeled fishing cooler 10 can optionally further comprise a first compartment 124 disposed within the cooler 40 and a second compartment 126 disposed within the cooler 40. A divider 128 is continuously disposed from the internal surface 54 of the right area 42 to the internal surface 54 of the left area 44. A pair of drain plugs 130 comprises a first drain plug 132 and a second drain plug 134. Each of the first drain plug 132 and the second drain plug 134 is continuously disposed through the right area 42 of the cooler 40 from the first compartment 124 and the second compartment 126, respectively, to the exterior 32 surface of the right side 22 of the base 20.

What is claimed is:

1. A wheeled fishing cooler comprising:
a base having a right side, a left side, a front side, a rear side, and a bottom side, each of the right side, the left side, the front side, the rear side, and the bottom side having an exterior surface and an interior surface, each of the right side, the left side, the front side, and the rear side having a top surface and a bottom surface;
a cooler disposed within the base, the cooler having a right area, a left area, a front area, a rear area, and a bottom area, each of the right area, the left area, the front area, the rear area, and the bottom area having an external surface and an internal surface, each of the right area, the left area, the front area, and the rear area having a top edge and a bottom edge;
wherein a surface area of the cooler substantially conforms to a surface area of the base;
a lid attached to the top surface of the base rear side, the lid having an upper surface and a lower surface;
a U-shaped telescopic handle having a right end and a left end, each of the right end and the left end disposed on the exterior surface of the front side and the rear side, respectively, proximal the base right side;
wherein the right end is colinearly disposed with the left end;
an axel continuously disposed through each of the front side and the rear side from proximal the exterior surface front side to proximal the exterior surface rear side proximal the bottom side and the right side, the axel having a right edge and a left edge;
a pair of wheels comprising a first wheel and a second wheel, each of the first wheel and the second wheel medially disposed through the axel right edge and the axel left edge, respectively;
a leg support comprising:
 a pair of horizontal supports comprising a front horizontal support and a rear horizontal support, each of the front horizontal support and the rear horizontal support having a back end and a front end, each of the front horizontal support and the rear horizontal support continuously disposed from proximal the right side to proximal the left side on the front side and the rear side, respectively;
 wherein the front horizontal support and the rear horizontal support are colinearly disposed;
 a pair of vertical supports comprising a front vertical support and a rear vertical support, each of the front vertical support and the rear vertical support having a top end and a bottom end, the bottom end of each of the front vertical support and the rear vertical support disposed on a surface of the ground, the top end of each of the front vertical support and the rear vertical support disposed on the front horizontal support and the rear horizontal support, respectively, proximal the front end;
 wherein the front vertical support and the rear vertical support are colinearly disposed;
 wherein the pair of vertical supports is perpendicularly disposed with the pair of horizontal supports; and
 a crossbeam continuously disposed underneath the base from proximal the front vertical support bottom end to proximal the rear vertical support bottom end;
 wherein the crossbeam is perpendicularly disposed with the pair of vertical supports;
a plurality of tubes, each of the plurality of tubes disposed on at least one of the front horizontal support and the rear horizontal support;
wherein each of the plurality of tubes is configured to hold a fishing rod and alternately a sun umbrella.

2. The wheeled fishing cooler of claim 1 further comprising:
a pair of hooks comprising a right hook and a left hook, each of the right hook and the left hook medially disposed on the right side and the left side, respectively, proximal the top surface;
wherein the pair of hooks is configured to securingly attach at least one elastic cord across the lid upper surface;
wherein the elastic cord is configured to securingly attach a plurality of chairs to the lid upper surface.

3. The wheeled fishing cooler of claim 1 further comprising:
a pair of grab handles comprising a right grab handle and a left grab handle, each of the right grab handle and the left grab handle medially disposed on the right side and the left side, respectively, underneath the right hook and the left hook, respectively;
wherein the pair of grab handles is configured to assist the user in lifting the base.

4. The wheeled fishing cooler of claim 3 wherein the pair of grab handles are rubberized.

5. The wheeled fishing cooler of claim 1 further comprising a plurality of cup holders, each of the plurality of cup holders disposed on the lid upper surface.

6. The wheeled fishing cooler of claim 1 further comprising:
a first compartment disposed within the cooler;
a second compartment disposed within the cooler;
a divider continuously disposed from the right area internal surface to the left area internal surface;
wherein a height of the divider substantially conforms to a height of the cooler;
wherein the divider is configured to separate the first compartment from the second compartment;
wherein the divider and the cooler bottom area are perpendicularly disposed; and
a pair of drain plugs comprising a first drain plug and a second drain plug, each of the first drain plug and the second drain plug continuously disposed through the cooler right area from the first compartment and the second compartment, respectively, to the exterior surface of the base right side.

7. The wheeled fishing cooler of claim 1 wherein the plurality of tubes is polyvinyl chloride.

8. A wheeled fishing cooler comprising:
a base having a right side, a left side, a front side, a rear side, and a bottom side, each of the right side, the left side, the front side, the rear side, and the bottom side having an exterior surface and an interior surface, each of the right side, the left side, the front side, and the rear side having a top surface and a bottom surface;
a cooler disposed within the base, the cooler having a right area, a left area, a front area, a rear area, and a bottom area, each of the right area, the left area, the front area, the rear area, and the bottom area having an external surface and an internal surface, each of the right area, the left area, the front area, and the rear area having a top edge and a bottom edge;
wherein a surface area of the cooler substantially conforms to a surface area of the base;
wherein the cooler is configured to be slidably removable from the base; a lid attached to the top surface of the base rear side, the lid having an upper surface and a lower surface;

a U-shaped telescopic handle having a right end and a left end, each of the right end and the left end disposed on the external surface of the front side and the rear side, respectively, proximal the base right side;

wherein the right end is colinearly disposed with the left end;

an axel continuously disposed through each of the front side and the rear side from proximal the exterior surface front side to proximal the exterior surface rear side proximal the bottom side and the right side, the axel having a right edge and a left edge;

a pair of wheels comprising a first wheel and a second wheel, each of the first wheel and the second wheel medially disposed through the axel right edge and the axel left edge, respectively;

a leg support comprising:
  a pair of horizontal supports comprising a front horizontal support and a rear horizontal support, each of the front horizontal support and the rear horizontal support having a back end and a front end, each of the front horizontal support and the rear horizontal support continuously disposed from proximal the right side to proximal the left side on the front side and the rear side, respectively;
  wherein the front horizontal support and the rear horizontal support are colinearly disposed;
  a pair of vertical supports comprising a front vertical support and a rear vertical support, each of the front vertical support and the rear vertical support having a top end and a bottom end, the bottom end of each of the front vertical support and the rear vertical support disposed on a surface of the ground, the top end of each of the front vertical support and the rear vertical support disposed on the front horizontal support and the rear horizontal support, respectively, proximal the front end;
  wherein the front vertical support and the rear vertical support are colinearly disposed;
  wherein the pair of vertical supports is perpendicularly disposed with the pair of horizontal supports; and
  a crossbeam continuously disposed underneath the base from proximal the front vertical support bottom end to proximal the rear vertical support bottom end;
  wherein the crossbeam is perpendicularly disposed with the pair of vertical supports;

a plurality of tubes, each of the plurality of tubes disposed on at least one of the front horizontal support and the rear horizontal support;

wherein each of the plurality of tubes is configured to hold a fishing rod and alternately a sun umbrella;

a pair of hooks comprising a right hook and a left hook, each of the right hook and the left hook medially disposed on the right side and the left side, respectively, proximal the top surface;

wherein the pair of hooks is configured to securingly attach at least one elastic cord across the lid upper surface;

wherein the elastic cord is configured to securingly attach a plurality of chairs to the lid upper surface;

a pair of grab handles comprising a right grab handle and a left grab handle, each of the right grab handle and the left grab handle medially disposed on the right side and the left side, respectively, underneath the right hook and the left hook, respectively;

wherein the pair of grab handles is configured to assist the user in lifting the base;

a plurality of cup holders, each of the plurality of cup holders disposed on the lid upper surface;

a first compartment disposed within the cooler;

a second compartment disposed within the cooler;

a divider continuously disposed from the right area internal surface to the left area internal surface;

wherein a height of the divider substantially conforms to a height of the cooler;

wherein the divider is configured to separate the first compartment from the second compartment;

wherein the divider and the cooler bottom area are perpendicularly disposed; and a pair of drain plugs comprising a first drain plug and a second drain plug, each of the first drain plug and the second drain plug continuously disposed through the cooler right area from the first compartment and the second compartment, respectively, to the exterior surface of the base right side.

* * * * *